May 8, 1962  G. A. LYON  3,032,857
APPARATUS FOR FORMING INTEGRAL RIBS UPON THE
CIRCUMFERENCE OF A RIGID TUBULAR SHAPE
Filed July 21, 1958  3 Sheets-Sheet 1
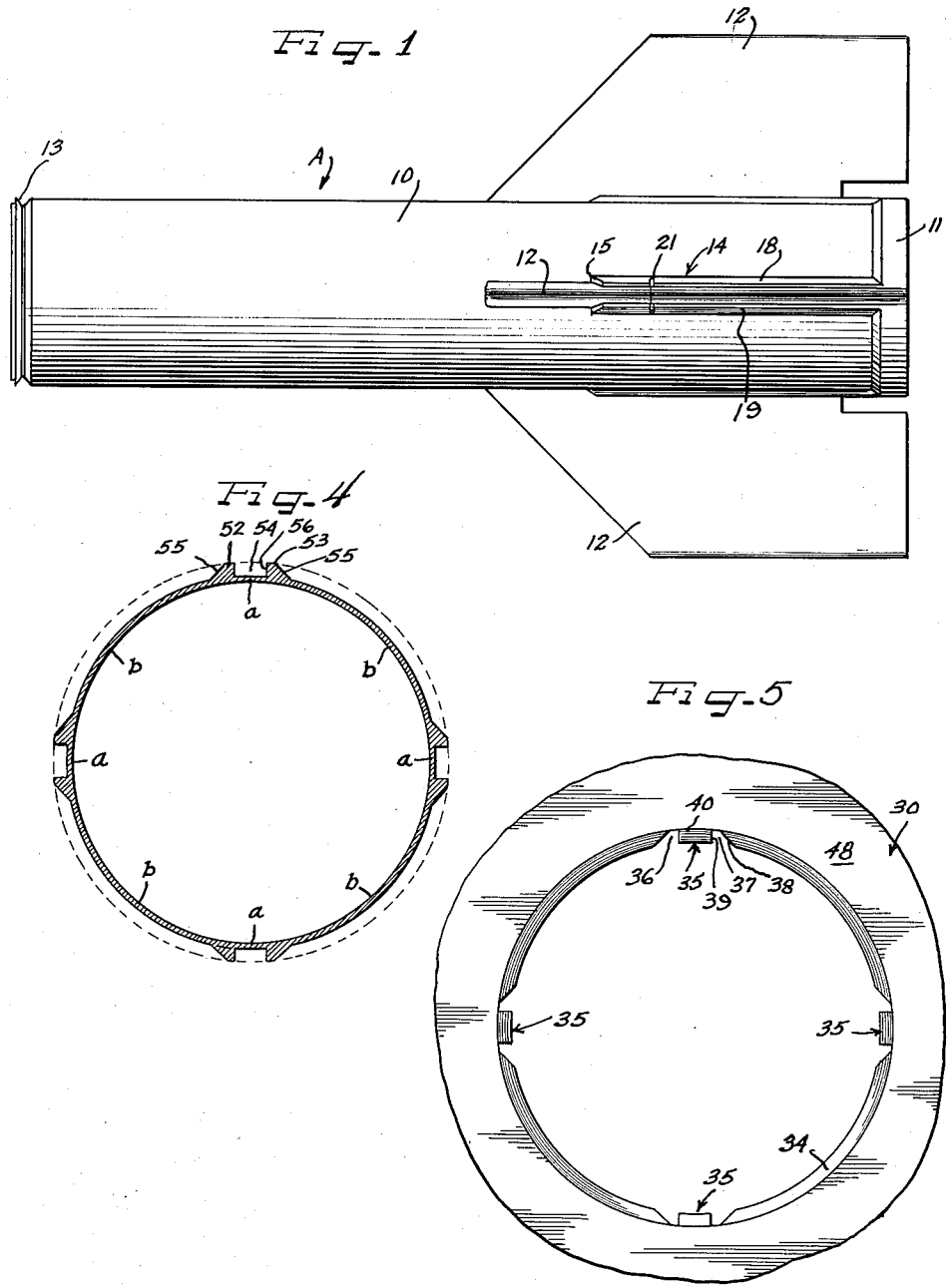
Inventor
George Albert Lyon May 8, 1962 G. A. LYON 3,032,857
APPARATUS FOR FORMING INTEGRAL RIBS UPON THE
CIRCUMFERENCE OF A RIGID TUBULAR SHAPE
Filed July 21, 1958 3 Sheets-Sheet 2

Inventor
George Albert Lyon

May 8, 1962  G. A. LYON  3,032,857
APPARATUS FOR FORMING INTEGRAL RIBS UPON THE
CIRCUMFERENCE OF A RIGID TUBULAR SHAPE
Filed July 21, 1958  3 Sheets-Sheet 3
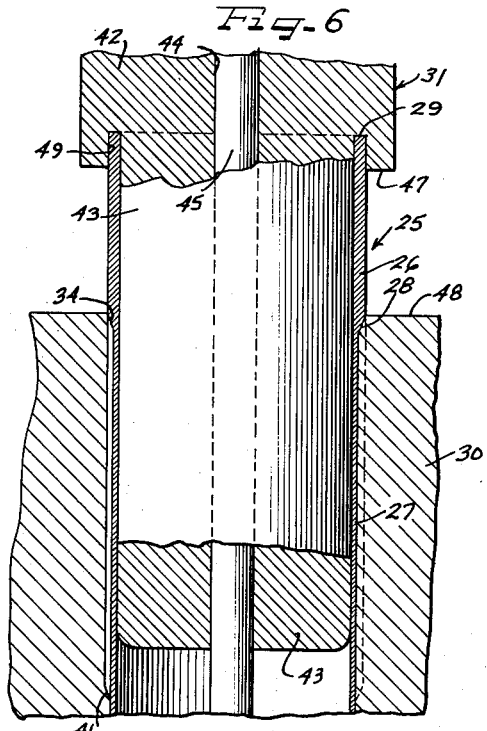
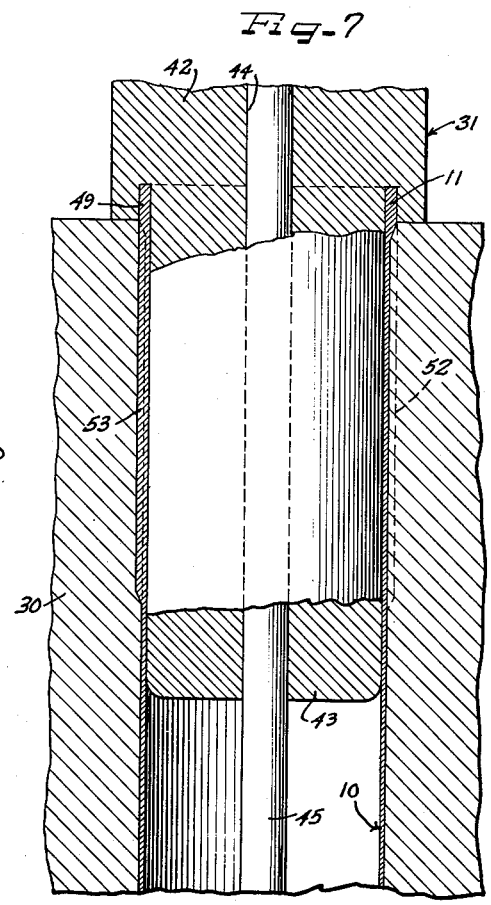
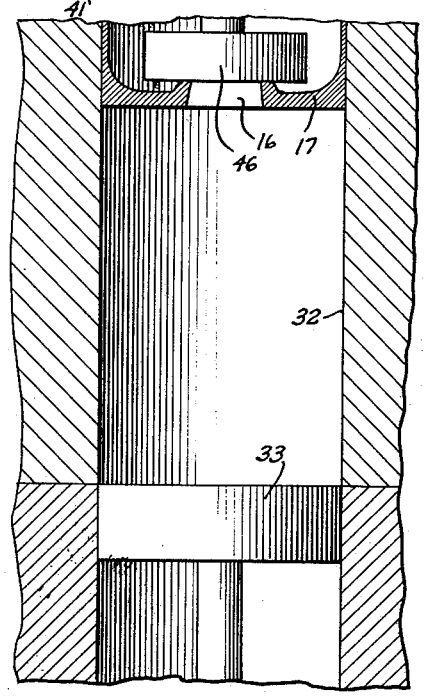
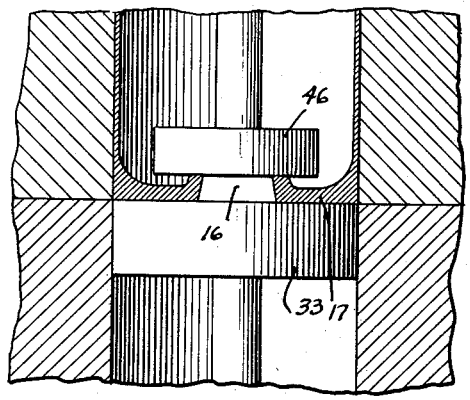
Inventor
George Albert Lyon

United States Patent Office 3,032,857
Patented May 8, 1962

3,032,857
APPARATUS FOR FORMING INTEGRAL RIBS UPON THE CIRCUMFERENCE OF A RIGID TUBULAR SHAPE
George Albert Lyon, Detroit, Mich., assignor to Lyon Incorporated, Detroit, Mich., a corporation of Delaware
Filed July 21, 1958, Ser. No. 750,000
2 Claims. (Cl. 29—1.21)

The present invention is directed in its broader aspects to the production of missile casings and related structures, and is more particularly concerned with a new and improved apparatus for producing a tubular shape having longitudinally extending integral fin receiving projections circumferentially spaced along the periphery thereof.

It is known in the art to produce rocket engine chambers and related missile casings by welding techniques, wherein a split cylindrical shape is first seam welded and control fins for supporting structure for the same attached to the shape by welds flowed therealong. Such a process is necessarily very time consuming and the resulting article leaves much to be desired by way of structural integrity. First, weak spots have been noted in the welds, and instances are known where the fin or control surface assembly separated from the missile casing under the severe flight conditions to which the airborne article is exposed. Second, areas of localized weakness are not infrequently found in the rolled sheet stock used in the present methods, and such weakness areas can of course lead to ultimate failure of the casing structure.

An important aim of the present invention is, therefore, to provide a novel apparatus for forming missile and related casings which overcomes in a relatively simple and highly effective manner the noted and other objections to the prior art methods.

Another object of the invention lies in the provision of a novel apparatus for forming circumferentially spaced and longitudinally extending projections upon the periphery of a hollow metal body in which there is first formed a tubular shape having wall portions of different thicknesses and the relatively thicker wall portion directed longitudinally into contact with extruding surfaces to move metal in said portion longitudinally forming circumferentially spaced projections therefrom while essentially simultaneously elongating the increased wall thickness portion between the projections without decreasing the wall thickness of said projections.

Another object of the invention is to provide a novel apparatus for forming integral projections upon a tubular shape featuring contacting one end of the shape with an longitudinally movable surface and directing the shape into extruding contact with a die surface to remove metal from one portion of the shape and form projections thereon of essentially the same thickness as said portion while transferring the metal removed and elongating the same to provide a constant thickness wall portion between the projections.

A further object of the present invention is to provide a novel apparatus for working upon a tubular shape of particular utility as a rocket engine housing, said shape having a plurality of spaced projections integral therewith extending radially and longitudinally at opposed locations along the cylindrical surface of the shape, each of said projections being of uniform wall thickness and circumferentially spaced with respect to one another by a reduced thickness wall portion of concentric inner and outer diameters from one end to the other of said tubular shape.

Other objects and advantages of the invention will become more apparent during the course of the following description, particularly when taken in connection with the accompanying drawings.

In the drawings, wherein like numerals are employed to designate like parts throughout the same:

FIGURE 1 is a plan view of a missile casing assembly with nose and fin portions attached, the casing having been formed in accordance with the principles of this invention;

FIGURE 4 is a sectional view of the tubular shape, prior to rib machining, as formed by the teaching of this invention;

FIGURE 5 is a fragmentary plan view of a die member within which the casing structure of this invention may be formed;

FIGURE 6 is a side elevational view, with parts in section, of a die and ram construction which may be employed to form ribs integral with the tubular shape following the teachings of this invention; and FIGURE 7 is a view similar to FIGURE 6 and showing the final position of the ram after formation of the ribs and elongation of the shape in the side wall portion between the integral ribs.

Referring now to FIGURE 1, there is shown for purposes of illustration a motor chamber assembly A comprising a casing 10 of cylindrical configuration having an integral raised collar portion 11 at its aft end and supporting upon its cylindrical surface a plurality of circumferentially spaced fins 12. A nose portion 13 of suitable shape closes the opposite end of the casing. As will be appreciated, the novel teachings of this invention are applicable to structures other than motor chambers, and may be utilized effectively with any hollow essentially cylindrical shape requiring integral supporting members thereon. Further, while the forming process of this invention is of proven utility with high strength steels, other metals may be similarly processed and good results obtained therefrom.

Figure 3:
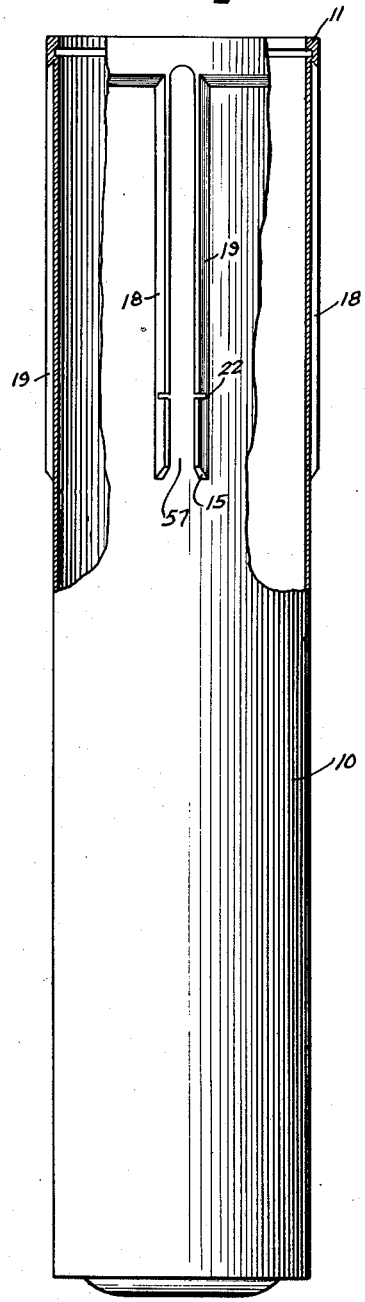
FIGURE 3 is a plan view of the casing, with a portion thereof being shown in section, illustrating the rib formation with fin or control member removed.
Figure 2:
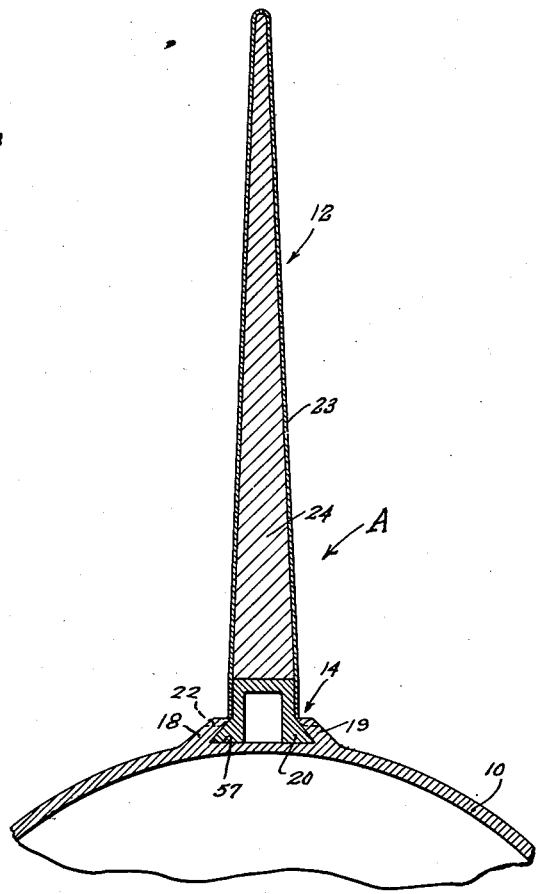
FIGURE 2 is a sectional view of the fin or control surface as supported in the rib construction formed in accordance with the teachings of the present invention.

Formed by the apparatus of this invention and extending a predetermined distance axially along the chamber or casing circumference are a plurality of rib members 14 receiving each of the fins or control members 12. Referring also to FIGURES 2 and 3, four rib members 14 are circumferentially spaced upon the cylindrical surface of the illustrative motor chamber 10 shown in the drawings. It will be appreciated, however, that the number and arrangement of the rib members and associated fins may vary, and may extend a greater or lesser distance along the length of the casing. In the structure illustrated, the rib members 14 terminate inwardly of the collar 11 at the aft end of the casing, said collar being provided to reenforce this portion of the casing. A centrally disposed opening 16 is formed in the end wall 17 at the opposite end of the casing (FIGURE 7), and said opening is generally threaded to receive the nose cap 13.

Each rib member 14 comprises a pair of upwardly and radially extending rib elements 18 and 19 of predetermined length and thickness, and between each of the rib elements 18 and 19 there is received a shaped base portion 20 on each of the fins 12. The base portion 20 of the fins may be hollow as indicated to reduce the weight thereof, and along the length of the base portion there is preferably provided a pair of outwardly extending wings or arms 21 received in notches 22 in each of the rib elements 18 and 19 to restrain movement of the fins 12. Forward ends of the rib members may also be beveled as shown at 15 in FIGURES 1 and 3.

The fins 12 are formed in any known manner, and may comprise a shaped aluminum alloy sheet 23 containing therewithin a suitable filler material 24. The filler 24 may be one of the foamed plastics, and if desired may be reenforced with glass fibers or the like. The base portion 20 of the fins 12 is also preferably of aluminum alloy.

With regard now to the casing forming process, it is preferred to first press into pancake shape a cleaned and heated slug cut from ingot and, by known punch and die techniques, extrude the pancake shape into a cup configuration possessed of a uniform wall thickness throughout. The cup shape is then subjected to additional steps, including extruding and cold heading, to produce a preliminary formed article of essentially the configuration designated in FIGURE 6 by the numeral 25. Specifically, by means of known punch and die constructions the cup shape is extruded along a major portion of its length to provide an integral collar portion 26 adjacent the open end of the shape 25 and having a wall thickness substantially greater than the remaining portion 27 of said shape and calculated as to thickness to provide the necessary metal mass from which the ultimately formed ribs 14 may be extruded. It is to be noted that, with the exception of the end wall portion 17, the shape 25 is characterized by an essentially constant or uniform inner diameter, and that both the relatively thicker collar portion 26 and relatively thinner body portion 27 are concentric throughout their respective axial lengths. Further, the axial inward extremity of the collar portion 26 is beveled or tapered as at 28, and the opposite extremity of said collar is essentially straight wall as designated at 29 in FIGURE 6.

It is preferable, prior to performance of the rib forming step to be now described, that the end wall 17 of the shape 25 be formed to essentially the configuration desired in the final casing 10. This may be done by known cold heading techniques and there is formed an embossment having an opening 16 therein and end wall configuration 17, which may be further cold headed subsequent to rib formation to produce a generally convex end wall. The end wall 17 surrounding the opening 16 is then threaded to receive the cap member 13.

Apparatus effective to provide a rib configuration upon the shape 25 essentially as shown in FIGURE 4, and to substantially simultaneously elongate the shape to the desired length, is shown in FIGURES 6 and 7 to which reference is now made. The apparatus comprises a die member 30 cooperating with a ram member 31, the die member being provided with a substantially cylindrical cavity 32 normally closed at one end by a knockout member 33. The die 30 may be constructed of any number of connecting sections in accordance with the practice in the art, and the opposite or upstream end of the cavity 32 is formed in a manner to provide a relatively wider mouth portion 34 beveled or tapered inwardly as shown.

Located immediately downstream or axially inwardly of the cavity mounth portion 34 and spaced about 90 degrees from one another around the cavity inner surface are a plurality of forming surfaces designated generally by the numeral 35. As appears in FIGURE 5, each set of forming surfaces 35 comprises a pair of circumferentially spaced grooves 36 and 37 of generally triangular configuration, shaped to include an angularly disposed wall 38 and a generally straight or radially disposed wall 39. Connecting with the walls 39 of each groove 36 and 37 is an essentially rectangular tooth portion 40. It may be seen from FIGURE 6 that the upstream portion of each set of forming surfaces 35 connects with the relatively wide mouth portion 34 of the cavity 32, and that the downstream portion of each set of forming surfaces 35 may be tapered or beveled as at 41. This may of course be varied to produce a particular rib configuration, and it will be further appreciated that the number, shape and location of the sets of forming surfaces 35 may be varied considerably, depending upon the particular application.

The ram member 31 connects with suitable means to impart axial travel thereto, and comprises a relatively wide diameter base portion 42 preferably integral with a relatively lesser diameter nose portion 43. The base and nose portions of the ram member are bored centrally as at 44 to receive therein a rod member 45 carrying a knockout member 46, the rod and knockout members being axially movable relative to the ram member 31 to permit removal of the ribbed and elongated shape from the ram member after completion of the forming operation.

The body portion 42 of the ram member 31 is provided with a relatively flat bottom surface 47 adapted to contact upper or top surface 48 of the die member 30, providing stop means limiting axial travel of the ram member 31 with respect to the die member 30. The ram member 31 is further formed axially inwardly of the bottom surface 47 thereof with a ring or circumferential groove 49 sized in diameter or width to receive a portion of the collar or relatively thicker wall portion 26 of the shape 25. The grooved arrangement in the ram member 31 is preferred to avoid damage to the end wall 29 of the shape 25, as well as to render remote any possibility of lateral shifting of the parts during the drawing step.

To form ribs upon the shape 25, as well as elongating the same to a predetermined length, the shape 25 is located in the die cavity 32 with the beveled end wall of the relatively thicker wall portion 26 resting or abutting against the wider mouth portion 34 of said cavity. The ram member 31 and knockout member 46 are then moved axially so that the nose portion 43 and knockout member 46 enter the open end portion of the shape 25. The relatively thicker wall portion 26 of the shape is then directed into the annular or ring groove 49 in the ram member 31 until the end wall 29 of the collar portion 26 abuts the end of the groove 49. Relative movement between the die member 30 and ram member 31 is caused to occur, preferably by imparting axial travel to the ram member 31, and the drawing surfaces 35 brought into metal moving relation with the relatively thicker wall portion 26 of the shape 25.

During axial travel of the portion 26 of the shape 25 against the drawing surfaces 35, by movement of the ram member 31, the metal mass in said portion 26 in axial alignment with the grooves 36 and 37 of said forming surfaces 35 is confined by or surrounded by said grooves, and essentially simultaneously, largely by reason of the resistance presented by the tooth portion 40 of said surfaces 35, the metal of the portion 26 between each of the forming surfaces is extended or elongated. Thus, while the tooth portion 40 of each set of forming surfaces 35 is moving the metal mass in its path axially and flowing the metal in circumferential directions ahead of its path of movement, the original metal thickness in the collar portion 26 is confined by the grooves 36 and 37, and a portion of the metal moved by the tooth 40 is flowed into the grooves 36 and 37 so that the ribs formed thereby are essentially of the same wall thickness as the relatively thicker or collar portion 26 of the shape 25. It is pertinent to note in this regard that the major portion of the elongation of the shape 25 occurs in the relatively thicker wall portion 26 and the relatively thinner wall portion 27 immediately adjacent thereto. Thus, when viewing FIGURES 6 and 7, it may be seen that little change in wall thickness of the lower or downstream portion 27 of the shape 25 has taken place. It is to be further noted that the metal mass in the portion 26 of the shape 25 provides essentially the entire body of metal required to form the desired ribs, elongate the ribs and elongate the wall structure between the ribs. Accordingly, essentially simultaneously sufficient metal is confined and moved into the grooves 36 and 37 to provide the desired rib configuration corresponding to original wall thickness of the portion 26 while at the same time providing sufficient metal to elongate or lengthen the metal mass in alignment with the grooves 36 and 37 to essentially the rib formation shown in FIGURE 7. Also simultaneously, the metal mass between adjacent pairs of grooves is elongated, as well as the metal acted upon by the base of the tooth portion 40 of each set of forming surfaces 35.

As noted, the length of the forming surfaces 35, as measured between the mouth portion 34 of the cavity 32 and the beveled ends 41 on said surfaces, may be varied as the application may require. When complete axial travel of the ram member 31 has occurred, and the surface 47 of the ram 31 and the surface 48 of the die 30 abut or bear against one another, the shape is formed and elongated to essentially the configuration indicated in FIGURE 7 by the numeral 10. The end wall 17 of the shape normally is then in contact with knockout member 33 and the knockout member 46 bears against the opposite surface thereof. The arrangement of parts is such that the rib formation is terminated inwardly of the end wall 29 to provide a metal mass of original thickness forming the collar portion 11 of the casing 10 as shown in FIGURE 1. Machining may of course be required in this area. The ram member 31 is then moved axially in the opposite direction, and if required, the shape 10 as thus formed may be acted upon by the knockout member 33 and the knockout member 46 brought to rapidly bear against the lower surface of the ram nose portion 43 to free the same from the inner surface of the shape 10.

Formed by the method described is a rib configuration of the character shown in section in FIGURE 4. It may be seen therein that shaped by the grooves 36 and 37 is a pair of spaced rib elements 52 and 53 separated by a U-shaped flat bottom groove 54 corresponding to the tooth portion 40 of each set of drawing surfaces 35. The rib elements 52 and 53 have the general triangular configuration of the grooves 36 and 37 of the forming surfaces 35 and accordingly, present sloping walls 55 and straight walls 56 defining the groove 54. As noted previously, the wall thickness of the rib elements 52 and 53 corresponds essentially to the original wall thickness of the portion 26 of the shape 25. It also is to be noted, that the wall thickness of the shape 10 between the rib elements 52 and 53, that is, in the region designated as *a* corresponds to the wall thickness of the side wall portions between each pair of rib elements and designated in FIGURE 4 by the legend *b*. The wall portions *a* and *b* of the shape 10 are concentric from one end to the other of said shape, and this is accomplished primarily by sizing the cavity 32 of the die 30 and sizing the cylinder surface of the neck portion 43 of the ram member 31. Experience has shown it is not required that the ram neck portion 43 be of the same length as the shape 10 ultimately formed in order to maintain concentricity.

Subsequent to the step of FIGURES 6 and 7, the end wall 17 may be further cold headed and the opening 16 threaded to receive the cap member 13 of the casing 10. Further, in order to provide the ultimate rib configuration as shown in FIGURES 1, 2 and 3, the rib elements 52 and 53 of FIGURE 4 are machined by grinding the inner corners thereof at an angle which additionally increases the width of the groove 54 so as to accommodate in wedged relation the base portion 20 of the fin or control surface 12. By the machining operation, the ribs 18 and 19 extend upwardly and inwardly toward one another in a generally oblique manner and a generally triangular groove 57 formed for the purpose indicated. The various portions of the assembly may then be mated into the structure of FIGURE 1.

It may be seen from the foregoing that applicant has provided a novel apparatus for forming tubular shapes with integral ribs thereon which is well adapted to production operations and assures consistently uniform and high quality results. The article also provided in accordance with the teachings of this invention is characterized by concentricity of the inner and outer surfaces of the shape, and high strength characteristics exist in all portions of the structure produced. Since there are no seams in the article, ruptures and other physical breakdowns often associated with prior art methods are essentially entirely avoided.

It may further be seen that by pushing the initially formed shape 25 of FIGURE 6 into drawing contact with the surfaces 35 on the die cavity 32, there is assured side wall portion *b* of consistently uniform shape and a substantial savings in the metal required. Thus, by the present method the rib elements 52 and 53 are continuously formed to essentially the final configuration desired, the only further step being machining as noted, and thereby there does not exist the possibility that the rib elements will be held back and the other or relatively thinner portions being moved forward to make an unequal draw length. Further, the rib elements 52 and 53 maintain their configuration during the simultaneous elongation of the other portion of the shape, and consequently a merging of the rib elements into adjacent side wall portions is remote. In addition, since there is little metal movement effected in the relatively thin wall portion 27 of the shape 25 (FIGURE 6), excessive pressures are not developed in said lower portion during formation of the ribs thereabove.

It will further be appreciated that various modifications may be effected in the procedures and structures herein disclosed without departing from the novel concepts of the present invention.

I claim as my invention:

1. Apparatus for forming integral ribs upon the circumference of a rigid tubular shape having a body portion of relatively greater wall thickness at one end than at the opposite end thereof, comprising a female die member having a cavity therein and means extending longitudinally along the inner upper surface of said cavity for essentially simultaneously forming a plurality of pairs of circumferentially spaced ribs having a thickness essentially the same as the original wall thickness of the relatively thicker body portion while elongating said body portion between said ribs and said pairs of ribs, said means including a plurality of circumferentially spaced arcuate forming surfaces which elongate the body portion between said pairs of ribs, and a plurality of forming tongues, one between each pair of the arcuate surfaces for elongating the body portion between each pair of ribs, each forming tongue being circumferentially spaced from a pair of arcuate forming surfaces to define a pair of rib-receiving grooves, a ram member movable longitudinally relative to the die member and having a nose portion received in and meeting with the tubular shape and a body portion provided with an annular recess receiving one end of said shape, and a knockout member to eject the completed product back through said die member and toward said ram member, whereby the ram and die members upon relative movement and final contact therebetween are effective by each of the forming tongues to move a band of the thicker portion of the shape longitudinally and by said tongues and arcuate forming surfaces forcing metal into the grooves while by said arcuate surfaces reducing the thickness of the body portion of the shape in the areas contacted thereby and ultimately leaving a thickened collar at the open end of said tubular shape.

2. Apparatus according to claim 1 and further including a knockout member axially movable in said ram member and projecting from the end thereof, which latter knockout member rests on the inside bottom of said tubular shape during the forming thereof, and thereafter is used in conjunction with the first-mentioned knockout member to loosen and eject the completed product as aforesaid.

References Cited in the file of this patent

UNITED STATES PATENTS

| | | |
|---|---|---|
| 387,472 | Weeden | Aug. 7, 1888 |
| 633,280 | Blakeslee | Sept. 19, 1899 |
| 962,714 | Meier | June 28, 1910 |
| 1,283,692 | Debenedetti | Nov. 5, 1918 |
| 1,295,430 | Carlson | Feb. 25, 1919 |
| 1,826,813 | Oberschulte | Oct. 13, 1931 |
| 1,925,823 | Singer | Sept. 5, 1933 |
| 2,104,222 | Decker | Jan. 4, 1938 |
| 2,133,467 | Purtell | Oct. 18, 1938 |
| 2,371,716 | Snell | Mar. 20, 1945 |
| 2,835,199 | Stanly | May 20, 1958 |
| 2,842,058 | Kuller | July 8, 1958 |
| 2,893,553 | Kreidler | July 7, 1959 |

FOREIGN PATENTS

| | | |
|---|---|---|
| 287,564 | Germany | Sept. 28, 1915 |
| 356,817 | Germany | July 31, 1922 |